United States Patent
Boudreau et al.

(10) Patent No.: US 9,264,912 B2
(45) Date of Patent: Feb. 16, 2016

(54) FRACTIONAL FREQUENCY RE-USE AND BEAMFORMING IN RELAY NODES OF A HETEROGENEOUS NETWORK

(75) Inventors: Gary David Boudreau, Kanata (CA); Konstantinos Dimou, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 657 days.

(21) Appl. No.: 13/353,926

(22) Filed: Jan. 19, 2012

(65) Prior Publication Data
US 2013/0190000 A1 Jul. 25, 2013

(51) Int. Cl.
| | |
|---|---|
| *H04W 40/00* | (2009.01) |
| *H04W 36/00* | (2009.01) |
| *H04W 72/00* | (2009.01) |
| *H04B 7/00* | (2006.01) |
| *H04W 4/00* | (2009.01) |
| *H04W 16/26* | (2009.01) |
| *H04W 74/00* | (2009.01) |
| *H04B 7/155* | (2006.01) |
| *H04W 84/04* | (2009.01) |
| *H04W 88/08* | (2009.01) |

(52) U.S. Cl.
CPC ............ *H04W 16/26* (2013.01); *H04B 7/15542* (2013.01); *H04W 74/004* (2013.01); *H04W 84/047* (2013.01); *H04W 88/08* (2013.01)

(58) Field of Classification Search
CPC ..... H04W 72/04; H04W 76/02; H04W 16/32; H04W 36/04
USPC ........... 455/444, 447, 450–452.1, 509, 422.1, 455/449
See application file for complete search history.

(56) References Cited

U.S. PATENT DOCUMENTS

| | | | |
|---|---|---|---|
| 5,893,033 A | 4/1999 | Keskitalo et al. | |
| 2008/0070582 A1* | 3/2008 | Cai | 455/450 |
| 2008/0207214 A1* | 8/2008 | Han et al. | 455/450 |
| 2010/0261493 A1 | 10/2010 | Guey et al. | |
| 2011/0053495 A1* | 3/2011 | Hara et al. | 455/7 |
| 2011/0263198 A1* | 10/2011 | Wu et al. | 455/7 |
| 2011/0306381 A1* | 12/2011 | Jia et al. | 455/522 |

(Continued)

FOREIGN PATENT DOCUMENTS

| | | |
|---|---|---|
| EP | 2 101 528 A1 | 9/2009 |
| EP | 2 536 192 A1 | 12/2012 |

(Continued)

OTHER PUBLICATIONS

Rohde & Schwarz, "LTE-Advanced Technology Introduction White Paper", http://www2.sohde-schwarz.com/file_13924/1MA169_2E.pdf.

(Continued)

*Primary Examiner* — Dung Hong
(74) *Attorney, Agent, or Firm* — Myers Bigel Sibley, P.A.

(57) ABSTRACT

Methods of operating a base station serving a cell in a heterogeneous network and at least one relay node serving a subcell of the cell, in which a user equipment unit connects to the network via the base station or the relay node, are provided. The methods include receiving uplink access (Uu) signals at the relay node from the user equipment unit in a first frequency range, and transmitting uplink backhaul (Un) signals from the relay node to the base station in a second frequency range that is different from the first frequency range.

15 Claims, 9 Drawing Sheets

RECEIVE ACCESS (UU) UPLINK SIGNALS IN A FIRST FREQUENCY RANGE
802

TRANSMIT BACKHAUL (UN) SIGNALS IN A SECOND FREQUENCY RANGE
804

(56) References Cited

U.S. PATENT DOCUMENTS

2012/0082087 A1* 4/2012 Takano .................. 370/315
2013/0225166 A1* 8/2013 Akhtar et al. ............ 455/435.1

FOREIGN PATENT DOCUMENTS

| WO | WO 2010/031436 A1 | 3/2010 |
| WO | WO 2010082234 A1 * | 7/2010 |
| WO | WO 2011/097764 A1 | 8/2011 |
| WO | WO 2011/126437 A1 | 10/2011 |
| WO | WO 2012/080800 A1 | 6/2012 |

OTHER PUBLICATIONS

Teyeb, O. et al., "Dynamic Relaying in 3GPP LTE-Advanced Networks", *EURASIP Journal on Wireless Communications and Networking*, Article ID 731317, 2009.

U.S. Appl. No. 13/192,638, filed Jul. 28, 2011, "Beam Forming for Cell Edge Capacity Improvement in a Heterogeneous Network".

Universal Mobile Telecommunications System (UMTS); Evolved Universal Terrestrial Radio Access (E-UTRA); Physical layer for relaying operation (3GPP TS 36.216 version 10.3.1 Release 10), Oct. 2011.

International Search Report and Written Opinion Corresponding to International Application No. PCT/IB2013/000059; Date of Mailing: Apr. 24, 2013; 14 Pages.

Jianguo Liu et al., "Inter-Cell Interference Coordination based on Soft Frequency Reuse for Relay Enhanced Cellular Network", *2010 21st IEEE International Symposium on Personal Indoor and Mobile Radio Communications*, Sep. 26, 2010, pp. 2304-2308.

International Preliminary Report on Patentability Corresponding to International Application No. PCT/IB2013/000059; Date of Mailing: Jun. 16, 2014; 11 Pages.

* cited by examiner

FRACTIONAL FREQUENCY RE-USE AND BEAMFORMING IN RELAY NODES OF A HETEROGENEOUS NETWORK

RELATED APPLICATIONS

The present application is related to co-pending U.S. application Ser. No. 13/192,638, filed Jul. 28, 2011, entitled "Beamforming For Cell Edge Capacity Improvement in a Heterogeneous Network," the disclosure of which is incorporated herein by reference in its entirety.

FIELD

The present application relates generally to heterogeneous networks and, more specifically, to heterogeneous networks including relay nodes.

BACKGROUND

The increasing demand for high data rates in cellular networks requires new approaches to meet this expectation. A challenging question for operators is how to evolve their existing cellular networks so as to meet the requirement for higher data rates. In this respect, a number of approaches are possible: i) increase the density of their existing base stations, ii) increase the cooperation between base stations, or iii) deploy smaller base stations (low power nodes, or LPNs) or relay nodes (RNs) in areas where high data rates are needed within a base stations grid.

The option of deploying smaller basestations is in general referred to in the related literature as a "Heterogeneous Network", or "Heterogeneous Deployment" and the layer consisting of smaller base stations is termed a "micro", or "pico" layer. The original larger base stations are then referred to in this context as "macro" base stations.

Building a denser macro base station grid, while simultaneously enhancing the cooperation between macro base stations (hence either using options i) or ii) above) is a solution that meets the requirement for higher data rates; however such an approach may not necessarily be a cost-efficient option, due to the costs and delays associated with the installation of macro base stations, especially in urban areas where these costs may be significant.

FIG. 1 shows the basic principle of heterogeneous deployments. Large macro cells 10, which are geographic areas nominally served by a base station, are generally able to provide coverage to a larger service area. However, the addition of smaller micro/pico cells 11 can improve network capacity in certain regions of those macro cells. micro/pico cells are essentially subcells of a macro cell, and are served by low power, short range nodes, such as micro/pico base stations, using frequencies allocated by the macro base station. Allocation of resources between the macro and micro/pico cells can be semi-static, dynamic or shared across the macro-micro/pico layers.

A relay node (RN) is a particular type of low power node that can be provided for enhancing the coverage and capacity of a macro base station. A relay node typically implements a reduced protocol stack as compared to a typical micro or picocell base station. In its simplest form, a relay node is simply a repeater that receives and amplifies a signal from a macro base station. More complex relay nodes may implement higher protocol levels, such as media access control (MAC) layer functionality, up to layers such as mobility management, session set-up and handover.

Referring to FIG. 2, a relay node 30 provides an intermediate node between a user equipment unit (UE) 40 and an eNodeB 20, referred to in this context as a "donor", "serving" or "anchor" eNodeB, as it is providing resources to the relay node 30. Communications between the relay node 30 and the UE 40 is performed using the Uu interface, which is the same interface that the UE 40 normally uses to communicate directly to the eNodeB 20; from the standpoint of the UE 40, there is no difference in the protocol used when communicating with a relay node.

Communications between the relay node 30 and the donor eNodeB 20, referred to as "backhaul" communications, is performed using the Un interface on both the uplink (relay node to eNodeB) direction and the downlink (eNodeB to relay node) direction.

One of the main objects of micro/pico layers is to offload as many users as possible from the macro layers. In an ideal scenario, this may enable users to experience higher data rates in both the macro and micro/pico layers.

In this respect, several techniques have been discussed and proposed within 3GPP:

i) Extending the range of small cells by using cell specific cell selection offsets. A cell selection offset is an additional power margin for a cell that must be overcome before a handover to the cell will occur. Setting the cell selection offset for a particular microcell to a negative value can therefore increase the probability of a handover occurring to the microcell, thereby extending the range of the microcell.

ii) Increasing the transmission power of low power nodes and simultaneously setting appropriately the uplink (UL) power control target PO for the users connected to low power nodes.

The solution of deploying small base stations within the already existing macro layer grid is an appealing option, since these smaller base stations are anticipated to be more cost-efficient than macro base stations, and their deployment time is expected to be shorter as well. Even so, there will be scenarios in which deployment of pico- or macro-base stations and their associated backhaul costs may be prohibitive. In such scenarios, the use of relay nodes that employ in-band backhaul communications may provide a viable option that provides pico cell type coverage either indoors or outdoors and mitigates the cost and effort of deploying land-line backhaul to all the pico base stations.

One of the problems with heterogeneous networks employing relay nodes is that the RN backhaul link (Un) between the donor base station 20 and the RN 30 can generate additional interference above the levels that would normally be experienced, into the macro network, which may adversely affect the capacity of the macro network.

For example, Un uplink transmissions to a given macro donor eNodeB 20 from a RN 30 can cause interference into the backhaul Un uplink transmissions of relay nodes in adjacent macro donor cells. Furthermore, Un transmissions from an RN 30 within one macro cell could also interfere with uplink transmissions between the terminals or user equipment (UEs) to their serving RNs in neighboring cells. These interference scenarios are illustrated in FIG. 3.

FIG. 3 illustrates a portion of a wireless network including three macro cells 111a, 111b and 111c served respectively by macro base stations 20a, 20b, 20c. Each of the macro cells includes a plurality of relay nodes 30, including relay node 30a in macro cell 111a and relay node 30c in macro cell 111c.

Each relay node defines an associated microcell, such as the microcell 120 defined by the relay node 30a in macro cell 111a, in which the relay node communicates with UEs 40 over Uu communication links. Moreover, each relay node communicates with its donor macro base station 20 over Un communication links to provide backhaul communications for the relay node. The Un communication links may be in-band links that use the same frequencies as are used in the microcell associated with the relay node. However, the Un and Uu communications may be orthogonal in time in order to reduce or avoid interference within the microcell 120. For example, the Un and Uu uplink communications at a relay node 40 may be time division multiplexed to occur at different times to reduce or avoid interference.

As further illustrated in FIG. 3, the primary lobe of a directional beam in the Un uplink formed by a relay node may be directed at the donor base station. For example, the primary lobe of the directional beam 131 generated by the relay node 30a is directed at the base station 20a. However, the side lobes and back lobe of the beam may be directed toward other cells. For example, the uplink Un beam formed by the relay node 30b in macro cell 111b may have a side/back lobe 141 that is directed at the relay node 30a and a side/back lobe 143 that is directed at a UR 40b in the macro cell 111a. These lobes may cause undesirable interference in Un communications in macro cell 111a.

In addition, a side/back lobe directed at an eNB in a neighboring macro cell can cause interference to the Un uplink interface.

A reciprocal situation can occur in which downlink (DL) transmission on the Uu link between the relay node 30 and the UE 40 could cause interference into the downlink Un signals of neighboring cell RNs 30. These scenarios may be likely to occur, since it is anticipated that one of the likeliest deployment scenarios for relay nodes is that in which relay nodes are deployed at cell edges of neighbor donor macro base stations; hence it is very likely relay nodes might be close to each other.

In Long Term Evolution (LTE) systems, the existing approach to mitigating this interference involves employing time division multiplexing of the Un and Uu transmissions within a donor cell in order to help mitigate the potential Un to Uu interference, as described in TS 36.216, E-UTRA Physical Layer for Relaying Operation, v10.3. Thus, for example the Un and Uu transmissions within a picocell served by a relay node 30 may be separated in time.

This approach could also be employed in combination with directional antenna beams between the serving eNodeB and the given RN(s) as shown in FIG. 3.

There are two main issues with the existing approaches. First, the use of time division multiplexing of the Un and Uu transmissions can mitigate interference within a given donor macro cell, but it does not guarantee mitigation of interference between RNs of adjacent donor cells. Even though the RN may use directional antennas for Un link, the sidelobes and or backlobe of the RN antenna for the Un link can still cause significant interference to RNs (i.e., the Uu link) in neighboring macro cells, since these RNs could be in close proximity. Such a situation may occur when RNs are deployed near the cell edge of neighboring macro cells, which is the most likely deployment scenario for relay nodes, as mentioned above. It can be possible to restrict in the time domain when neighboring cell RNs can transmit on their respective Un and Uu links, however this would require strict time synchronization between neighboring macro cells and the RNs within the neighboring cells. In general cellular networks may not be synchronized, thus a solution for deployment of relay nodes in unsynchronized networks will also be of benefit.

SUMMARY

Embodiments of the present invention are directed to alleviating one or more problems of the prior art.

Some embodiments provide methods of operating a base station serving a first cell in a heterogeneous network and at least one relay node serving a subcell of the first cell in which a user equipment unit connects to the network via the base station or the relay node. The methods include receiving uplink access (Uu) signals at the relay node from the user equipment in a first frequency range, and transmitting uplink backhaul (Un) signals from the relay node to the base station in a second frequency range that is different from the first frequency range.

The first frequency range and the second frequency range may be subranges of a bandwidth that is available for use by user equipment within the cell. The first frequency range and the second frequency range may not be contiguous in frequency space.

The first frequency range may be reused for access communication in subcells served by other relay nodes within the cell. In some embodiments, the first frequency range may be reused for access communication in subcells of other cells. In some embodiments, the second frequency range may be reused for backhaul uplink communication in other cells.

The methods may further include receiving a signal strength indicator at the base station from one or more UEs located in the cell, identifying a weak coverage area in the cell according to the signal strength indicator, and directing a beam forming antenna of the base station towards the weak coverage area.

The methods further include transmitting backhaul (Un) uplink signals from a second relay node to the base station using a third frequency range that is different from the first frequency range and the second frequency range.

The third frequency range may be reused for backhaul uplink communication in other cells. The second frequency range may be reused for backhaul uplink communication by a second relay node within the first cell.

The methods may further include transmitting backhaul (Un) uplink signals from a third relay node in a second cell that is adjacent to the first cell using a third frequency range that is different from the first frequency range and the second frequency range. The third frequency range may be reused for backhaul uplink communication by a fourth relay node within the second cell.

Some embodiments provide a relay node for use in a cell defined by a coverage are of a base station. The relay node includes an antenna, a receiver coupled to the antenna and configured to receive an access (Uu) uplink signal from a user equipment in a subcell defined by a coverage area of the relay node over a first frequency range, and a transmitter coupled to the antenna and configured to transmit a backhaul (Un) uplink signal to the base station using a second frequency range that is different from the first frequency range.

Some embodiments are directed to a base station for use in a heterogeneous network, wherein user equipment connects to the heterogeneous network via the base station. The base station includes an antenna, a transmitter coupled to the antenna, a receiver configured to receive a backhaul (Un) uplink signal from a relay node over a first frequency range, and a processor configured to instruct the receiver to receive the uplink backhaul signal and to transmit instructions to the relay node to use a second frequency range that is different from the first frequency range for access (Uu) uplink signals.

A heterogeneous communication system includes a base station serving a cell in the heterogeneous communication system, and a relay node serving a subcell of the cell. A user equipment connects to the heterogeneous communication system via the base station or the relay node. The relay node is configured to receive uplink access (Uu) signals from the user equipment in a first frequency range, and to transmit uplink backhaul (Un) signals to the base station in a second frequency range that is different from the first frequency range.

A second relay node may be provided in the cell. The second relay node is configured to transmit backhaul (Un) uplink signals to the base station using a third frequency range that is different from the first frequency range and the second frequency range.

The third frequency range may be reused for backhaul uplink communication in other cells.

The second frequency range may be reused for backhaul uplink communication by a second relay node within the cell.

The system may further include a third relay node in a second cell that is adjacent to the first cell. The third relay node is configured to transmit backhaul (Un) uplink signals using a third frequency range that is different from the first frequency range and the second frequency range.

The third frequency range may be reused for backhaul uplink communication by a fourth relay node within the second cell.

Other aspects and features of the present invention will become apparent to those of ordinary skill in the art upon review of the following description of specific embodiments of the invention in conjunction with the accompanying figures.

DETAILED DESCRIPTION

Figure 1:
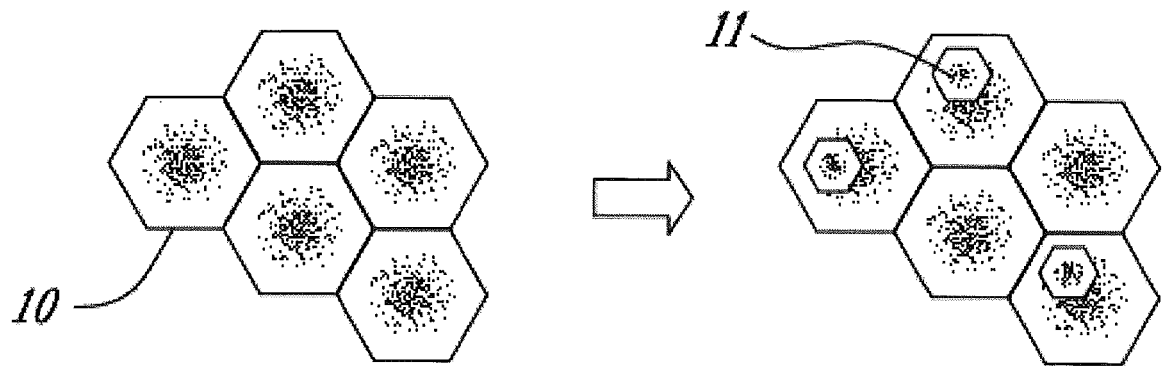
FIG. 1 is a schematic diagram illustrating a conventional heterogeneous network.
Figure 2:
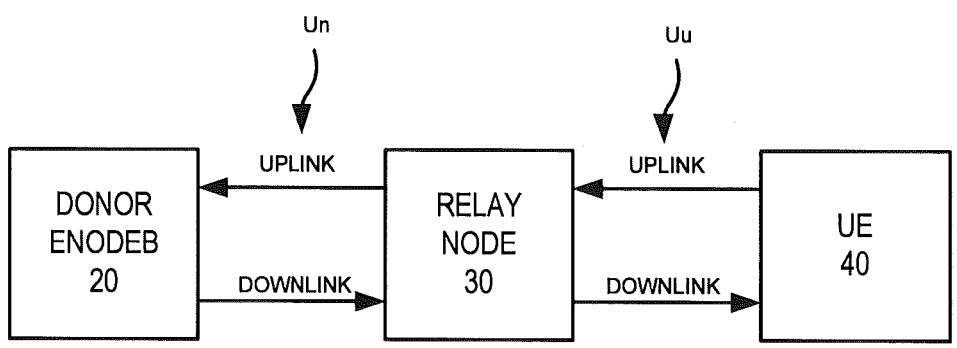
FIG. 2 is a schematic diagram illustrating backhaul and access links of a relay node in a conventional heterogeneous network.
Figure 3:
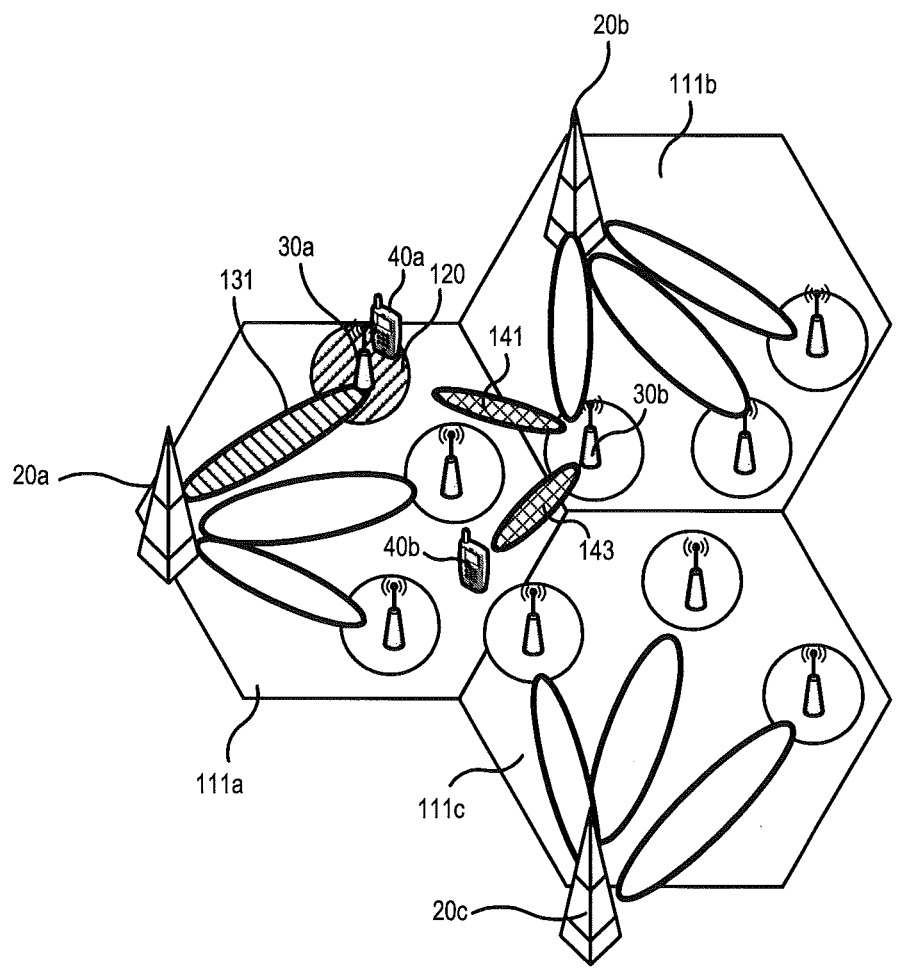
FIG. 3 is a schematic diagram illustrating potential interference caused by backhaul uplink communication signals in a conventional heterogeneous network.

In the following description, the following acronyms will be used:
DL Downlink
UL Uplink
FFR Fractional Frequency Reuse
HetNet Heterogeneous Network
RN Relay Node
Un Backhaul link between a donor base station and the relay node
Uu Access link between a relay node and the terminals or UEs served by the relay node.

Some embodiments of the present invention use a combination of fractional frequency re-use and/or targeted beamforming between the Un and Uu links of neighboring cells to mitigate interference between Un and Uu transmissions between cells.

Some embodiments provide intra-cell Un-to-Uu FFR in a Relay Node in which the FFR is implemented within a donor macro cell between Un and Uu transmissions in combination with beamforming on Un link between RNs and eNodeBs. The FFR partition can be across the Un and Uu transmissions, and also more generally the FFR partition can include the individual Un beams to the serving eNodeB.

Some further embodiments provide inter-cell Un-to-Un FFR for which FFR is implemented across Un and Uu links between neighboring donor cells.

Moreover, donor eNodeB beamforming to cell edge UEs may be employed in some embodiments to mitigate coverage gaps at the cell edge.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As indicated above, the present invention addresses the issues brought out by the aforementioned prior art.

The concept of heterogeneous networks (HetNet) has emerged in the context of Long Term Evolution (LTE) and LTE-Advanced. A heterogeneous network is a radio access network that comprises layers of different-sized cells ranging from big (macrocells) to small (microcells, picocells and femtocells). In order to reach the full bandwidth capacity of either protocol, it is thought that operators will need to supplement their traditional large macrocells with many different-sized small cells.

The importance of the HetNet concept and the work that's going on in standards bodies, such as the Institute of Electrical and Electronics Engineers Inc. (IEEE) and 3rd Generation Partnership Project (3GPP), is that it will define how all those different-sized cells will work together, how hand-off among them will be achieved, and how interference among them will be minimized.

Typically a heterogeneous radio access network comprises plural macro and micro cells. Further, in some heterogeneous radio access networks the operation of the macro base stations for the macro cells and micro base stations for the micro cells may be coordinated, particularly in a Coordinated Multipoint (CoMP) system. In a CoMP architecture a collection of cells (e.g., the coordinated set of cells) may be connected to a central node that coordinates the transmission/reception of user signals to mitigate interference among the smaller sub-cells. CoMP architecture is understood with reference to, e.g., U.S. patent application Ser. No. 12/563,589, entitled "Inter-Cell Interference Mitigation", also published as United States Patent Publication US 2010/0261493, which is incorporated herein by reference in its entirety.

With reference to the present invention, it should be understood that in the illustrated embodiments, the micro cells and micro base stations and their respective locations within or near the macro cell are not limiting, since a macro cell could encompass one or more than the illustrated micro cells and such micro cells may be diversely and non-uniformly arranged from one macro cell to another, depending upon geographic utilization and traffic need and conditions.

As used herein, the terminology "micro base station" is to be understood as broadly encompassing any type of station which operates over a radio or air interface on both downlink (DL) and uplink (UL) and has extent of transmission that is lesser than (e.g., in geographic range or power) or subordinate to (e.g., delegated from/by) a macro base station. In corresponding fashion the terminology "micro cell" refers to any cellular territory or coverage area served by such broadly defined micro base station. Examples of types of cells and base stations encompassed by the terminology "micro cell" and "micro base station" also include pico cells and pico base stations, femto cells (which can exist in a femto cluster) and femto base stations, and relay base stations. Small base stations mainly means base stations transmitting with lower power and with fewer processing/hardware capacities than the normal macro base stations.

Some embodiments of the invention can mitigate interference in relay node channels. These embodiments describe solutions for implementation on the uplink (UL); however a similar approach can be applied to the downlink.

Embodiment 1

Relay Node Intra-Cell FFR Between Un and Uu Links

In a first embodiment, intra-cell Un-to-Uu fractional frequency reuse (FFR) is employed to mitigate interference between Un and Uu transmissions within a cell. The proposed configuration is illustrated in FIG. 4A, for which FFR is implemented within each given cell between Un and Uu transmissions in addition to having directive beamforming on the Un links between RNs and eNodeBs.

Figure 4A:
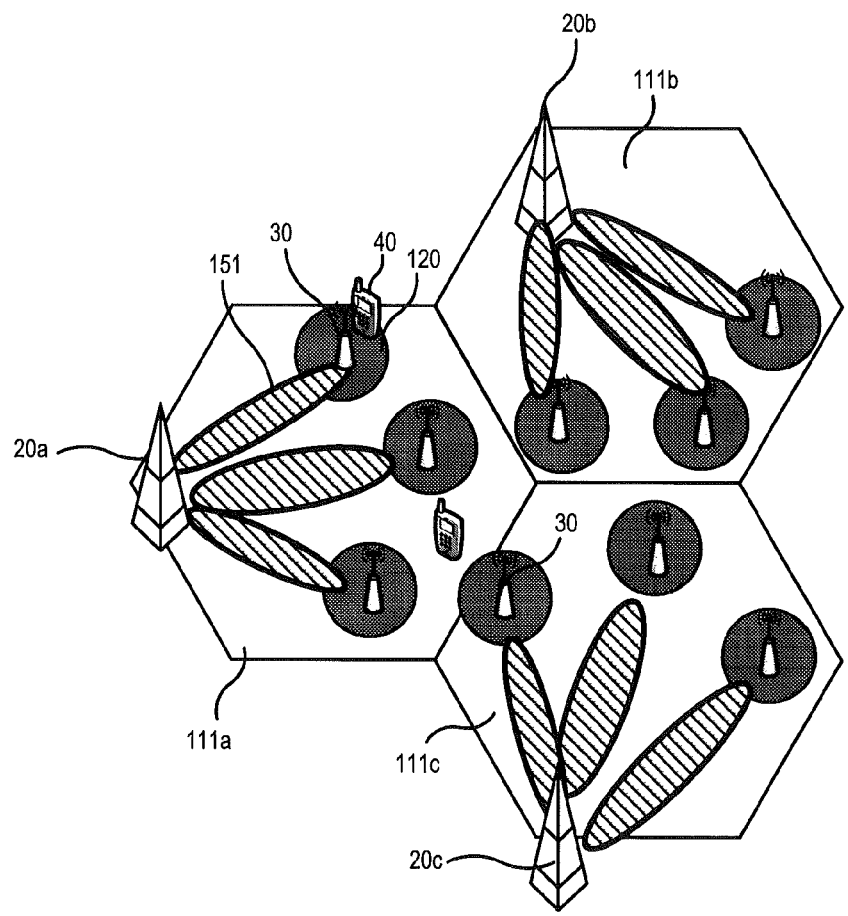
FIGS. 4A and 4B are schematic diagrams illustrating backhaul uplink communications in accordance with some embodiments of the present invention.
Figure 4B:
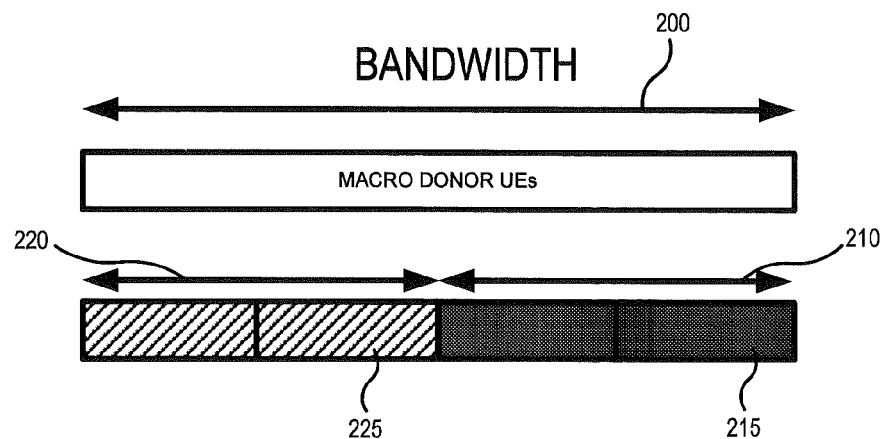

FIG. 4A illustrates the mapping of frequency regions to the spatial areas of the donor cell and relay nodes, whereas FIG. 4B illustrates the FFR frequency partitioning.

FIG. 4A illustrates a portion of a wireless network including three macro cells 111a, 111b and 111c served respectively by macro base stations 20a, 20b, 20c. Each of the macro cells includes a plurality of relay nodes 30 and UE units 40.

Each relay node 30 defines an associated microcell 120, in which the relay node communicates with UEs 40 over Uu communication links. Moreover, each relay node communicates with its donor macro base station 20 over Un communication links 151 to provide backhaul communications for the relay node.

As further illustrated in FIG. 4A, the primary lobe of a directional beam in the Un uplink formed by a relay node 30 may be directed at the donor base station. This directionality provides isolation between Un uplink communication links 151 in a macro cell 111. Because the Uu uplink communications and the Un uplink communications use different frequency ranges, it may not be necessary in these embodiments to separate the Uu and Un uplink transmissions in time, e.g. using time division multiplexing.

Referring to FIG. 4B a bandwidth space 200 encompasses frequencies used within a macro cell 120. UEs 40 served by the donor eNodeB 20 (macro donor UEs) can be assigned resources within the entire frequency space. However, microcells 120 are limited to using frequencies in a first range 210 of the bandwidth 200 for Uu communications with UEs 40, while backhaul Un communications between a relay node 30 and the donor eNodeB 20 are limited to frequencies in a second range 220 of the bandwidth 200.

Moreover, within a microcell 120, Uu uplink frequencies are limited to a first subset 215 of the first range 210, while Un uplink frequencies are limited to a second subset 225 of the second range 220 of frequencies. The first subset 215 of frequencies used for Uu uplink communications may not be contiguous in frequency space with the second subset 225 of frequencies used for Un uplink communications.

In the embodiments illustrated in FIGS. 4A and 4B, dedicated frequency resource blocks (RBs) are assigned to the Un links 151 between the donor eNodeB 20 and the relay nodes (RN) 30, and separate dedicated frequencies are assigned within the RN coverage area. Furthermore, in this embodiment, the donor eNodeB 20 may assign RBs across the entire available frequency band.

FIG. 4A illustrates an implementation for the uplink (UL). A similar approach can be applied to the downlink. This approach allows for flexibility of the assignment of resources in the donor cell within the time dimension and does not require any rigid Un vs Uu timing boundaries and synchronization to mitigate the Un-to-Uu interference. However, with the implementation of this embodiment, Un and Uu transmissions can be unsynchronized in time-both within a given relay node and within different relay nodes of the same donor. Macro eNodeB- and Uu-to-Uu interference will still be mitigated.

Figure 10:
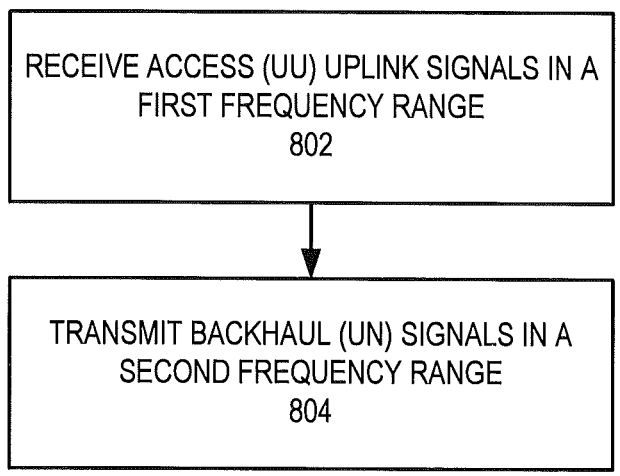
FIGS. 10-13 are block diagrams illustrating operations of systems/methods according to some embodiments.

Operations according to Embodiment 1 shown in FIG. 4A are illustrated in the flowchart of FIG. 10. As shown therein, the operations include receiving access (Uu) uplink signals in a first frequency range (block 802) and transmitting backhaul (Un) signals in a second frequency range that is different from the first frequency range (block 804).

Embodiment 2

Relay Node Intra-Cell FFR Between Un and Uu Links with Un Partitioning

The second embodiment is a generalization of the intra-cell Un-to-Uu FFR defined in Embodiment 1. In this case, FFR is employed to mitigate interference between Un and Uu transmissions within a cell, by not only having the Un and Uu links served by different frequency partitions, but also having each Un beam between the donor eNodeB 20 and the RNs 30 within the donor cell coverage allocated a different frequency partition.

Figure 5A:
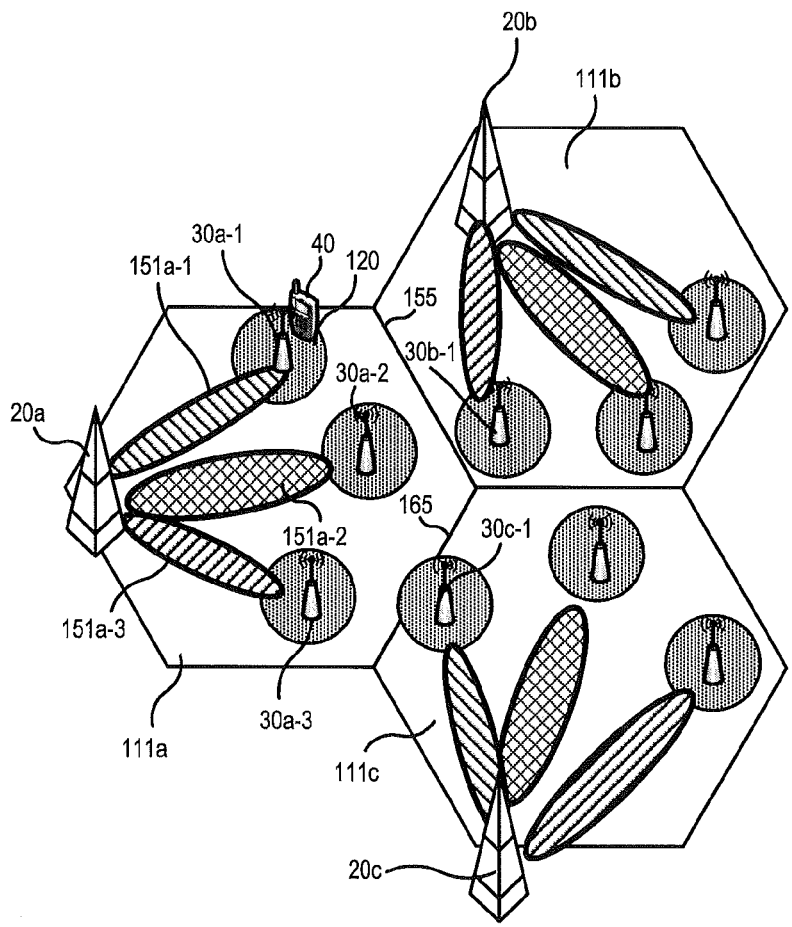
FIGS. 5A and 5B are schematic diagrams illustrating backhaul uplink communications in accordance with further embodiments of the present invention.
Figure 5B:
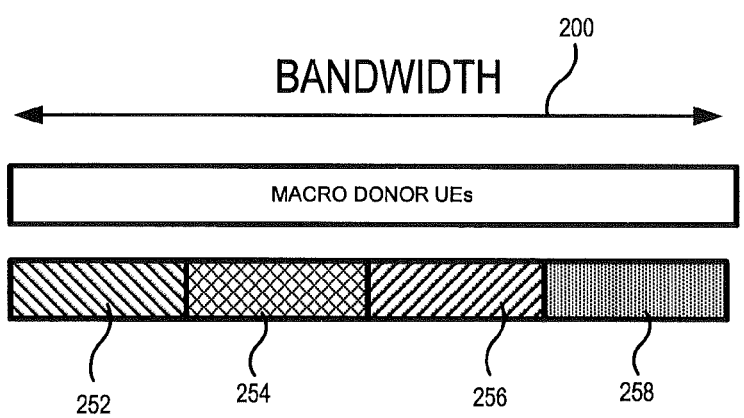

The second embodiment is illustrated in FIGS. 5A and 5B, in which FFR is implemented within each given cell between Un and Uu transmissions, and each individual Un link. FIG. 5A illustrates the mapping of frequency regions to the spatial areas of the donor cell and relay nodes, while FIG. 5B illustrates the FFR frequency partitioning.

Referring to FIG. 5A, in a macrocell 111a, each of the Un uplink beams 151a-1, 151a-2 and 151a-3 is assigned a different frequency range, while a separate frequency range is assigned to the relay nodes 30a-1, 30a-2 and 30a-3 for Uu uplink communications.

This frequency allocation is illustrated in FIG. 5B, which shows that the total bandwidth available 200 in a macrocell is divided up into sub-ranges 252, 254, 256 and 258, which are allocated respectively to Un uplink communications on beam 151a-1, Un uplink communications on beam 151a-2, Un uplink communications on beam 151a-3, and Uu uplink communications. Although illustrated in FIG. 5B as being equal in bandwidth, it will be appreciated that the sub-ranges 252 to 258 may have different sizes, and that the sizes of the sub-ranges may be adjusted dynamically by the donor eNodeB 20 in response to changes in factors such as resource demand, channel conditions, etc.

In this embodiment, dedicated frequency resource blocks (RBs) are assigned to the Un links between the donor eNodeB and the relay node (RN) and separate dedicated frequencies are assigned within the RN coverage area. Furthermore, in this embodiment, the donor cell may assign RBs across the entire available frequency band. FIG. 5A illustrates an implementation for the UL; however the same approach applies equally to the downlink.

Some spatial frequency planning may also be performed in these embodiments. For example, two adjacent cells may coordinate the use of Un frequencies so that the cells do not use the same Un frequencies to communicate with relay nodes 30 that are near a cell boundary between the two adjacent cells. In particular embodiments, two adjacent cells may coordinate the use of Un frequencies so that the cells do not use the same Un frequencies to communicate with relay nodes 30 that are closer to the cell boundary between the two adjacent cells than to any other adjacent cell boundary. In another aspect, two adjacent cells may coordinate the use of Un frequencies so that the cells do not use the same Un frequencies to communicate with relay nodes 30 for which the receive signal strength of signals from the donor nodes 20 of the two cells are stronger than the receive signal strength from any other donor node 20 in the network.

Thus, for example, relay nodes 30a-2 and 30b-1, which are both close to the cell boundary 155 between macro cell 111a and macro cell 111b would not use the same frequency range for Un communications, while relay nodes 30a-3 and 30c-1, which are both close to the cell boundary 165 between macro cell 111a and macro cell 111c would not use the same frequency range for Un communications.

This approach trades off some flexibility of the assignment of resources in the donor cell within the frequency dimension in order to provide additional interference mitigation between Un links within a donor cell. This is beneficial during time intervals of simultaneous transmissions from different relay nodes within the same macro cell to their donor eNodeB for which the spatial separation is not adequate to ensure that the interference is mitigated.

Figure 11:
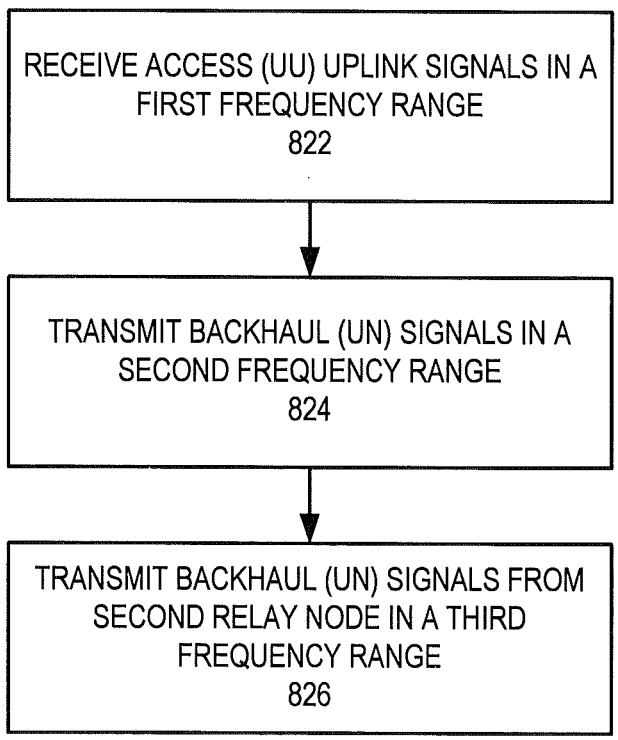

Operations according to Embodiment 2 are illustrated in the flowchart of FIG. 11. As shown therein, the operations include receiving access (Uu) uplink signals in a first frequency range (block 822) and transmitting backhaul (Un) signals in a second frequency range that is different from the first frequency range (block 824). In addition, the operations include transmitting backhaul (Un) signals from a second relay node 30 in the macrocell in a third frequency range that is different from the first frequency range and the second frequency range (block 824).

Embodiment 3

Relay Node Inter-Cell FFR Between Un and Uu Links

Embodiment 3 mitigates interference to both the Un-to-Un and Un-to-Uu interference both within and between donor cells when Un and Uu transmissions are unsynchronized. This is achieved as illustrated in FIG. 6A, which illustrates the mapping of frequency regions to the spatial areas of the donor cell and relay nodes, while FIG. 6B illustrates the FFR frequency partitioning.

Figure 6A:
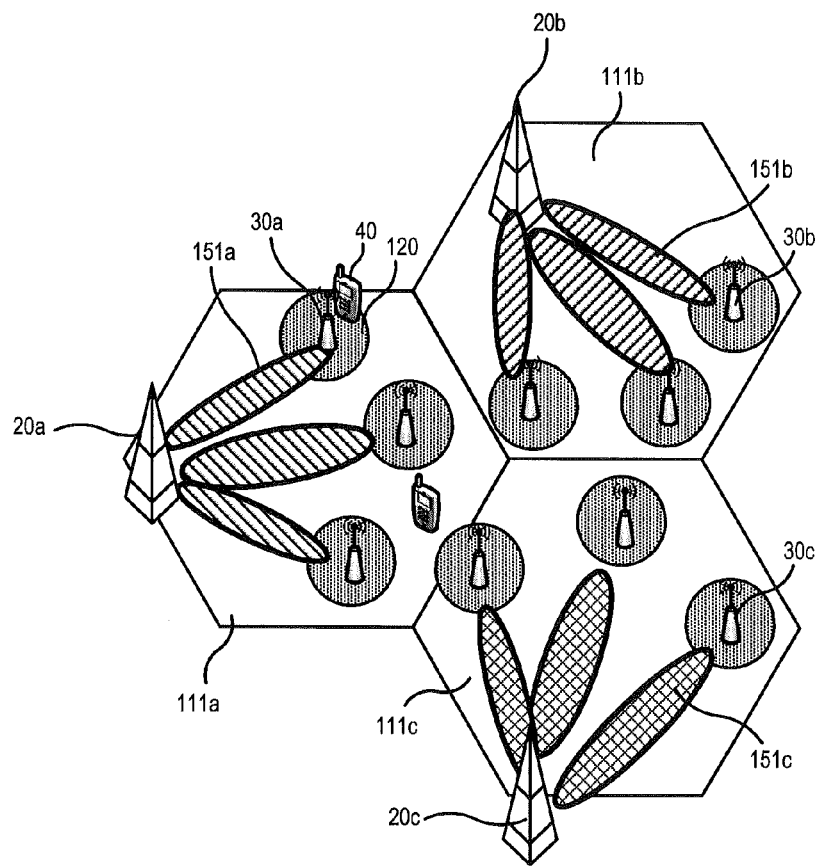
FIGS. 6A and 6B are schematic diagrams illustrating backhaul uplink communications in accordance with still further embodiments of the present invention.
Figure 6B:
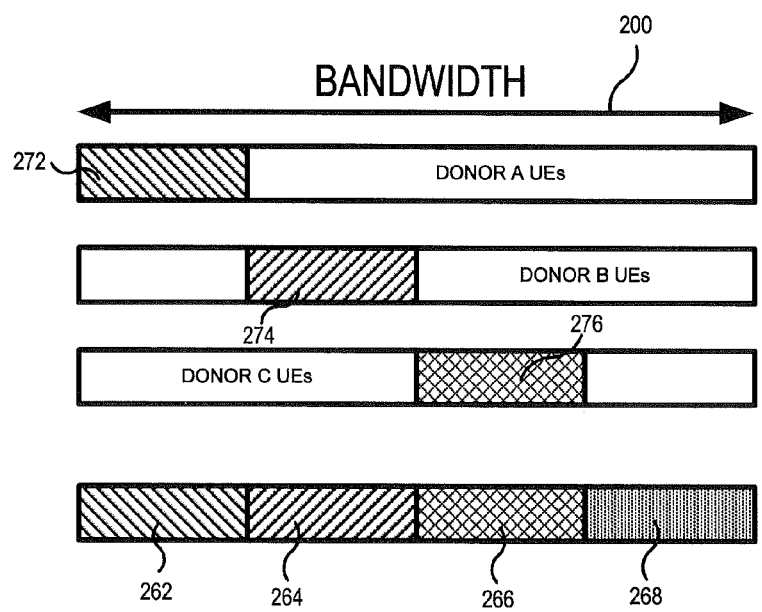

Referring to FIGS. 6A and 6B, Un uplink transmissions in each macrocell use a defined frequency range that is different from the frequency ranges used in adjacent macrocells. Thus, for example, the Un uplink beams 151a in macrocell 111a utilize a first frequency range 262 that is a subset of the overall bandwidth. Likewise, Un uplink beams 151b in macrocell 111b utilize a second frequency range 264, and Un uplink beams 151c in macrocell 111c utilize a third frequency range 266. Uu uplink communications in each relay node 30a, 30b and 30c use the same frequency range 268.

To further reduce potential interference, UEs 40 in cell 111a may be precluded from being assigned resources within an exclusion zone 272 that corresponds to the frequency range 262 that is used for Un communications in cell 111a. Similarly, UEs 40 in cell 111b may be precluded from being assigned resources within an exclusion zone 274 that corresponds to the frequency range 264 that is used for Un communications in cell 111b, while UEs 40 in cell 111c may be precluded from being assigned resources within an exclusion zone 276 that corresponds to the frequency range 266 that is used for Un communications in cell 111c.

In this embodiment, Un/Uu transmissions to/from the relay nodes 30 within a macro cell 111 may be coordinated, for example using time division multiplexing to reduce potential intra-cell interference.

In this embodiment, dedicated frequency resource blocks (RBs) are assigned to the Un links between the donor eNodeB 20 and the relay node (RN) 30, and a separate dedicated frequency partition is assigned within the RN coverage area. Furthermore the Un links within a cell achieve orthogonality through the use of beamforming, whereas inter-donor cell Un links are separated using separate partitions of the FFR scheme.

As is the case in embodiments 1 and 2, the assignment of RBs to UEs served by any of the donor eNodeBs 20 can employ any RB within the frequency band, subject of the Un backhaul exclusion zone. Within the coverage area of an RN 30, the Uu transmissions can employ both the common Uu frequency partition as well as the donor cell Un frequency partition if the Un and Uu transmissions of a given RN are orthogonal in time.

It should also be noted that if the Un and Uu transmissions of a given RN 30 maintain their given frequency partitions, the Un and Uu transmissions could occur simultaneously in theory, although the implementation of the duplexer in the RN may be challenging and expensive. However, if frequency bands are available within a given relay node 30, simultaneous transmission and reception is feasible without the need of an expensive and powerful duplexer. Temporary guard bands may be used so as to separate the Un from the Uu transmissions within a macrocell 111. FIG. 6A illustrates an implementation for the uplink; however a similar approach may be applied to the downlink.

In some further embodiments, the frequency partition boundaries may be fixed, but may not necessarily have equal the number of RBs. In still further embodiments, frequency partition boundaries may be dynamically selected based on the relative proportional traffic expected for given partition. The relative proportional traffic is defined as the offered traffic load within the partition divided by the available capacity of the link.

Figure 12:
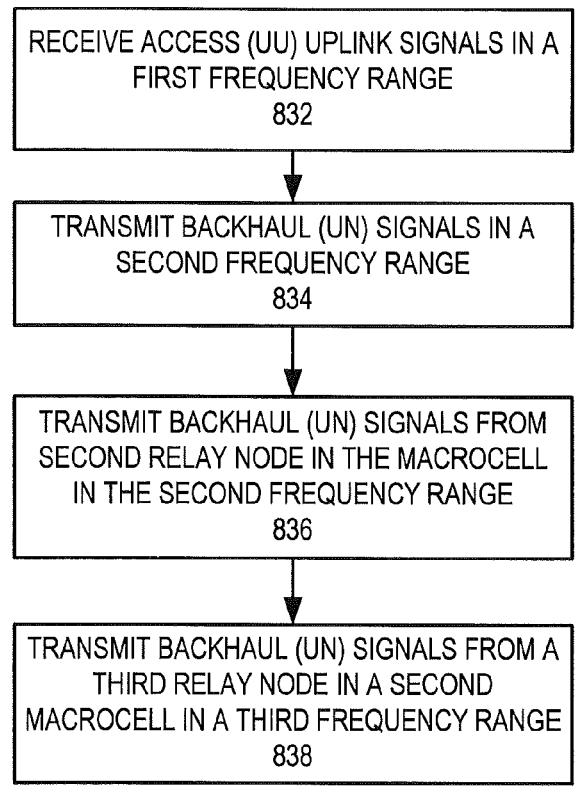

Operations according to Embodiment 3 are illustrated in the flowchart of FIG. 12. As shown therein, the operations include receiving access (Uu) uplink signals in a first frequency range (block 832) and transmitting backhaul (Un) signals in a second frequency range that is different from the first frequency range (block 834). In addition, the operations include transmitting backhaul (Un) signals from a second relay node 30 in the macrocell in the second frequency range (block 836), and transmitting backhaul (Un) signals from a third relay node 30 in an adjacent macrocell in a third frequency range that is different from the first and second frequency ranges (block 838).

Embodiment 4

Donor eNodeB Beamforming to Cell Edge

Figure 7:
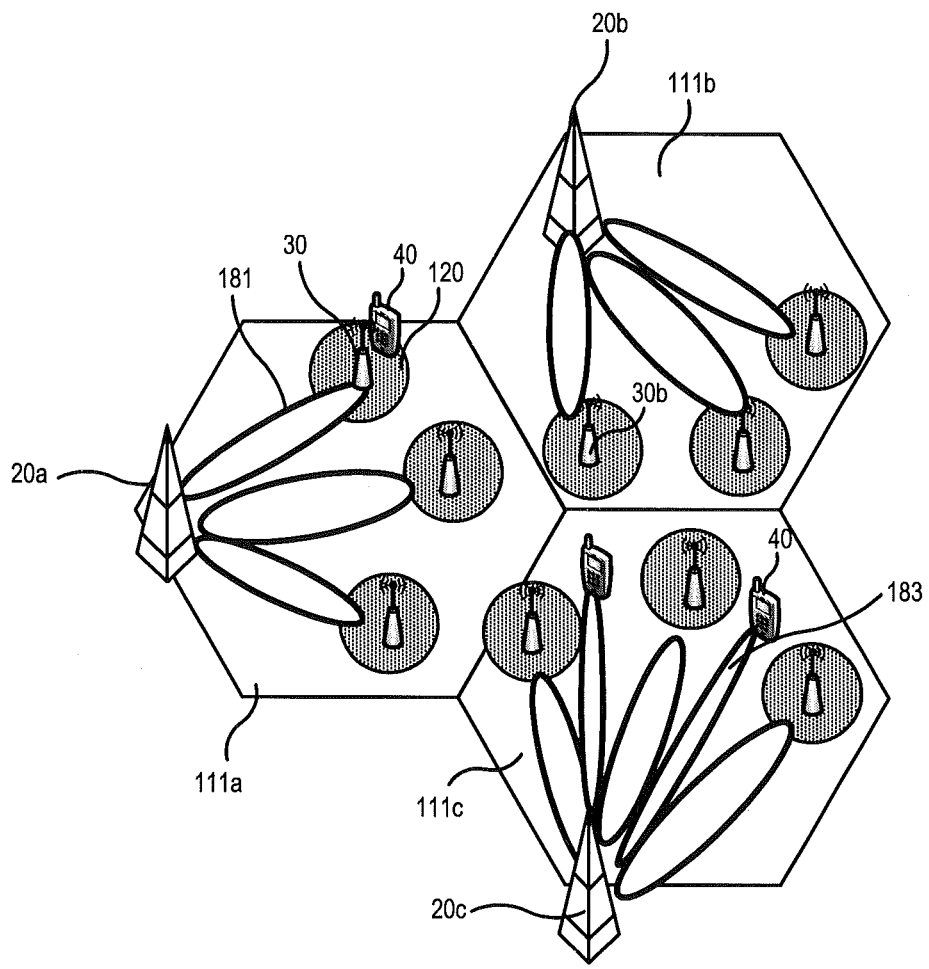
FIG. 7 is a schematic diagram illustrating beam steering techniques that can be used in accordance with some embodiments of the present invention.

Embodiment 4 builds on embodiments 1, 2 and 3 by adding the implementation of donor eNodeB Beamforming to cell edge UEs to mitigate coverage gaps at cell edge between the RN coverage areas. This concept is illustrated in FIG. 7 and adapts the concepts described in U.S. patent application Ser. No. 13/192,638 filed Jul. 28, 2011, entitled "Beamforming for Cell Edge Capacity Improvement in a Heterogeneous Network", the disclosure of which is incorporated herein by reference.

For example, referring to FIG. 7, in some embodiments, the donor base stations 20a, 20b and 20c may identify locations of UEs located in poor coverage areas of the macrocell in response to signal strength indicators indicating that UEs are in weak coverage areas. The donor base stations 20 can direct beams 181 toward UEs 40 that are located within microcells 120 to provide enhanced coverage in the event that the relay node 30 is not able to service a UE. Similarly, the donor base stations 20 can direct beams 183 to UEs 40 that are located within the macrocell 111 but are outside the range of any microcells 120.

Figure 13:
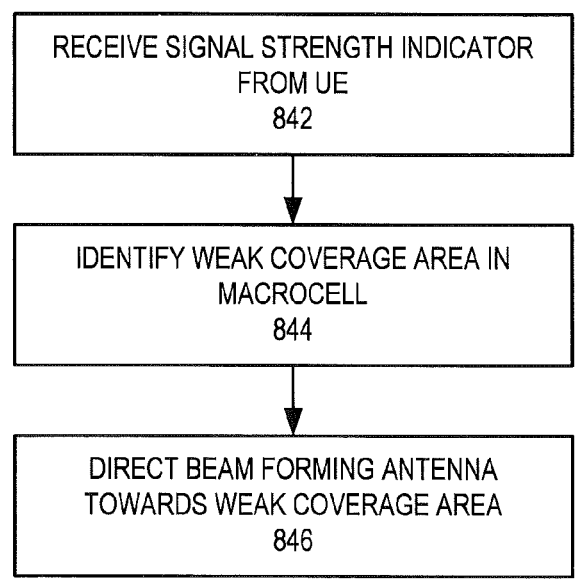

Operations according to Embodiment 4 are illustrated in the flowchart of FIG. 13. As shown therein, the operations include receiving a signal strength indicator at a base station from a UE (block 842) and responsively identifying a weak coverage area in a macrocell (block 844). Finally, the operations include directing a beam forming antenna of the base station toward the weak signal area (block 846).

Some embodiments described herein may mitigate the interference between Un and Uu links as well as Un to Un links within a heterogeneous network employing relay nodes. Embodiments of the invention can mitigate interference both within donor macrocells as well as between donor macrocells, and may not require explicit synchronization between neighboring cells.

Figure 8:
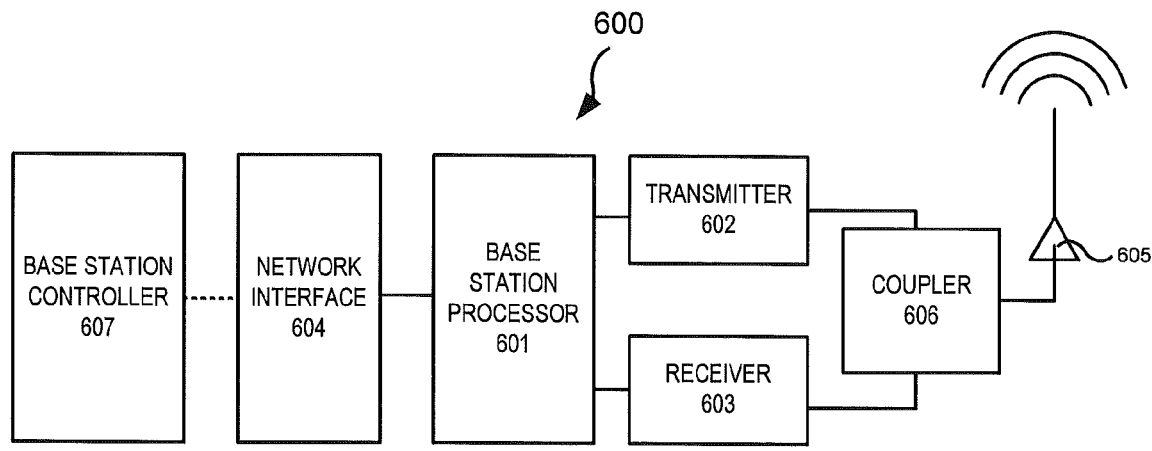
FIG. 8 is a block diagram of a base station according to some embodiments.

A block diagram of an embodiment of a base station 600 is shown in FIG. 8. The base station 600 typically includes a base station processor 601 coupled to a transmitter 602 and receiver 603, and network interface 604. Transmitter 602 and receiver 603 are coupled to antenna 605 via coupler 606. The base station processor 601 will typically perform the above described methods and algorithms for a predetermined macro cell. A base station controller 607 will interact with one or more base stations 600 when there is a need to control the overall operation of the network. The base station processor 601 would typically have the necessary functionality and procedures for processing between the media access control and physical layers of both transmission and reception signals. Similarly, the base station controller 607 in conjunction with the base station 600 is used to provide the necessary beam forming techniques described herein.

Figure 9:
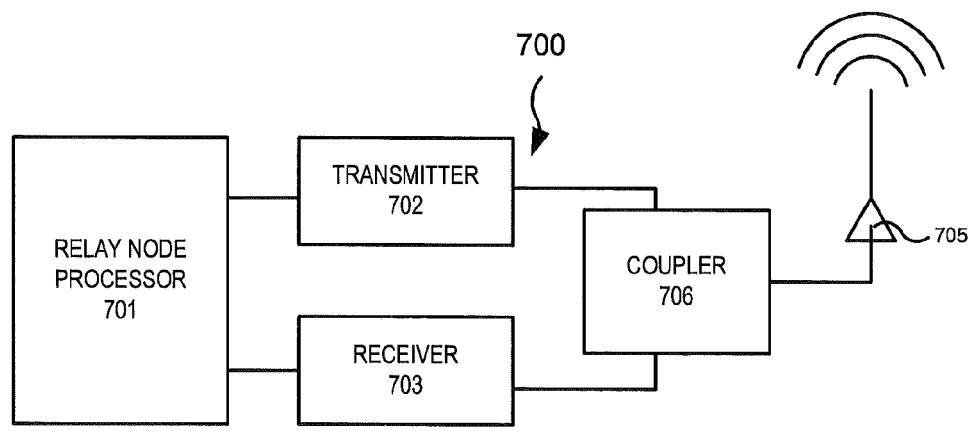
FIG. 9 is a block diagram of a relay node according to some embodiments.

A block diagram of an embodiment of a relay node 700 is shown in FIG. 9. The relay node 700 typically includes a relay node processor 701 coupled to a transmitter 702 and receiver 703. Transmitter 702 and receiver 703 are coupled to antenna 705 via coupler 706. The relay node processor 701 will typically perform the above described methods and algorithms for a predetermined microcell. The relay node processor 701 includes the necessary functionality and procedures for processing between the media access control and physical layers of both transmission and reception signals. The relay node processor 701 is also configured to provide the necessary beam forming techniques described herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of operating a base station serving User Equipments (UFs) in a first cell in a heterogeneous network including at least one relay node positioned within a coverage area of the first cell and serving UEs in a subcell of the first cell, wherein a UE in the first cell connects to the network via the base station or the relay node, the method comprising at the base station:
   instructing the relay node to receive uplink access (Uu) signals at the relay node from the user equipment unit in a first frequency range;
   receiving uplink backhaul (Un) signals from the relay node in a second frequency range that is different from the first frequency range, wherein the first frequency range and the second frequency range are not contiguous in frequency space;
   receiving a signal strength indicator from one or more UES located in the first cell;
   identifying a weak coverage area in the first cell according to the signal strength indicator; and
   directing a beam forming antenna of the base station towards the weak coverage area.

2. The method of claim 1, wherein the first frequency range and the second frequency range are subranges of a bandwidth that is available for use by user equipment units within the first cell.

3. The method of claim 1, wherein the first frequency range is reused for access communication in subs served by other relay nodes within the first cell.

4. The method of claim 1, wherein the first frequency range is reused for access communication in subcells of other cells.

5. The method of claim 1, wherein the second frequency range is reused for backhaul uplink communication in other cells.

6. The method of claim 1, wherein the at least one relay node comprises a first relay node and wherein a second relay node is provided in the first cell, the method further comprising;
   receiving backhaul (Un) uplink signals from the second relay node using a third frequency range that is different from the first frequency range and the second frequency range.

7. The method of claim 6, wherein the third frequency range is reused for backhaul uplink communication in other cells.

8. The method of claim 1, Wherein the at least one relay node comprises a first relay node, and wherein the second frequency range is reused for backhaul uplink communication by a second relay node within the first cell.

9. The method of claim 8, further comprising:
   receiving backhaul (Un) uplink signals from a third relay node in a second cell that is adjacent to the first cell using a third frequency range that is different front the first frequency range and the second frequency range.

10. The method of claim 9, wherein the third frequency range is reused for backhaul uplink communication by a fourth relay node within the second cell.

11. A base station for use in a heterogeneous network, wherein user equipment units (UEs) connect to the heterogeneous network via the base station, comprising:
   an antenna;
   a transmitter coupled to the antenna;
   a receiver configured to receive a backhaul (Un) uplink signal from a relay node positioned within a coverage area of a cell served by the base station over a first frequency range; and
   a processor configured to instruct the receiver to receive the uplink backhaul signal, to transmit instructions to the relay node to use a second frequency range that is different from the first frequency range for access (Un) uplink communications with a UE, wherein the first frequency range and the second frequency range are not contiguous in frequency space,
   wherein the processor is further configured to receive a signal strength indicator from one or more UEs located in a cell served by the base station, to identify a weak coverage area in the cell according to the signal strength indicator, and to direct a beam from the antenna towards the weak coverage area.

12. The base station of claim 11, wherein the first frequency range and the second frequency range are subranges of a bandwidth that is available for use by user equipment units within the first cell.

13. The base station of claim 11, wherein the first frequency range is reused for access communication in subcells served by other relay nodes within the first cell.

14. The base station of claim 11, wherein the first frequency range is reused for access communication in subcells of other cells.

15. The base station of claim 11, wherein the second frequency range is reused for backhaul uplink communication in other cells.

* * * * *

UNITED STATES PATENT AND TRADEMARK OFFICE
CERTIFICATE OF CORRECTION

| | |
|---|---|
| PATENT NO. | : 9,264,912 B2 |
| APPLICATION NO. | : 13/353926 |
| DATED | : February 16, 2016 |
| INVENTOR(S) | : Boudreau et al. |

It is certified that error appears in the above-identified patent and that said Letters Patent is hereby corrected as shown below:

On the Title Page, in Item (56), under "OTHER PUBLICATIONS", in Column 2, Line 2, delete "sohde" and insert -- rohde --, therefor.

In the specification

In Column 1, Line 51, delete "cells." and insert -- cells --, therefor.

In Column 2, Line 31, delete "PO" and insert -- P0 --, therefor.

In Column 3, Line 8, delete "node 40" and insert -- node 30 --, therefor.

In Column 3, Line 19, delete "UR" and insert -- UE --, therefor.

In Column 3, Line 20, delete "Un" and insert -- Uu --, therefor.

In Column 9, Line 41, delete "bandwidth available 200" and insert -- bandwidth 200 available --, therefor.

In the claims

In Column 13, Line 35, in Claim 1, delete "(UFs)" and insert -- (UEs) --, therefor.

In Column 13, Line 49, in Claim 1, delete "UES" and insert -- UEs --, therefor.

In Column 13, Line 60, in Claim 3, delete "subs" and insert -- subcells --, therefor.

In Column 14, Lines 6-7, in Claim 6, delete "comprising;" and insert -- comprising: --, therefor.

In Column 14, Line 15, in Claim 8, delete "Wherein" and insert -- wherein --, therefor.

In Column 14, Line 23, in Claim 9, delete "front" and insert -- from --, therefor.

In Column 14, Line 39, in Claim 11, delete "(Un)" and insert -- (Uu) --, therefor.

Signed and Sealed this
Twenty-fourth Day of May, 2016

Michelle K. Lee
*Director of the United States Patent and Trademark Office*